US008478365B2

(12) United States Patent
Takahashi

(10) Patent No.: US 8,478,365 B2
(45) Date of Patent: Jul. 2, 2013

(54) MOBILE TERMINAL APPARATUS

(75) Inventor: Kosuke Takahashi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 477 days.

(21) Appl. No.: 12/067,934

(22) PCT Filed: Sep. 29, 2006

(86) PCT No.: PCT/JP2006/319524
§ 371 (c)(1),
(2), (4) Date: Feb. 24, 2009

(87) PCT Pub. No.: WO2007/037405
PCT Pub. Date: Apr. 5, 2007

(65) Prior Publication Data
US 2009/0270140 A1    Oct. 29, 2009

(30) Foreign Application Priority Data

Sep. 29, 2005 (JP) .................................. 2005-284435

(51) Int. Cl.
*H04M 1/00* (2006.01)
(52) U.S. Cl.
USPC ............................ 455/575.1; 455/90; 455/347
(58) Field of Classification Search
USPC ....................................................... 455/575.1
See application file for complete search history.

(56) References Cited

U.S. PATENT DOCUMENTS

| | | | | |
|---|---|---|---|---|
| 4,912,602 A | * | 3/1990 | Zurek et al. | 361/752 |
| 5,612,657 A | * | 3/1997 | Kledzik | 333/247 |
| 5,909,819 A | * | 6/1999 | Adachi et al. | 220/623 |
| 6,111,760 A | * | 8/2000 | Nixon | 361/814 |
| 6,861,821 B2 | * | 3/2005 | Masumoto et al. | 320/107 |
| 6,917,517 B1 | * | 7/2005 | Iida | 455/347 |
| 7,509,151 B1 | * | 3/2009 | Edwards | 455/575.1 |
| 7,510,791 B2 | * | 3/2009 | Moon et al. | 429/7 |
| 7,514,176 B2 | * | 4/2009 | Hirota | 429/179 |
| 7,551,949 B2 | * | 6/2009 | Schworm | 455/575.1 |
| 2003/0162083 A1 | * | 8/2003 | Sakuma et al. | 429/61 |
| 2004/0038121 A1 | * | 2/2004 | Song et al. | 429/97 |

FOREIGN PATENT DOCUMENTS

| | | |
|---|---|---|
| JP | 2002008606 | 1/2002 |
| JP | 2002324534 | 11/2002 |
| JP | 2002334686 | 11/2002 |
| JP | 3530007 | 5/2004 |
| JP | 2004153103 | 5/2004 |
| JP | 2005005199 | 1/2005 |

OTHER PUBLICATIONS

International Search Report for PCT/JP2006/319524, mailed on Dec. 12, 2006, 2 pages.

* cited by examiner

*Primary Examiner* — Ajibola Akinyemi
(74) *Attorney, Agent, or Firm* — Duane Morris LLP

(57) ABSTRACT

A mobile terminal apparatus includes a casing 8, an operation key member 10 disposed on one external face 9*a* of the casing 8, a circuit board 11 disposed inside the casing 8 so as to face the operation key member 10, and a battery 12 disposed inside the casing 8 so as to face the circuit board 11 on a side opposite the operation key member 10. The battery 12 includes board supporting parts 15 for supporting the circuit board 11, the board supporting parts 15 having tip portions 15*a* abutting against the circuit board 11 at positions facing the circuit board 11.

16 Claims, 7 Drawing Sheets

MOBILE TERMINAL APPARATUS

TECHNICAL FIELD

The present invention relates to mobile terminal apparatuses such as mobile communication apparatuses having batteries.

BACKGROUND ART

Current mobile phones can remove a battery from the casing thereof and replaced it with an auxiliary battery, if the amount of electricity charged in a battery becomes insufficient.

FIG. 7 illustrates an exemplary known mobile terminal apparatus. A mobile phone includes a rear case 1 constituting a casing, a battery 3 to be accommodated in a recess 2 on the back face of the rear case 1, and a lid 4 that covers the battery 3 from the side opposite the recess 2 and that is engaged with the rear case 1.

The known mobile terminal apparatus can reduce the thickness of the casing as a result of omitting a partition of the recess 2 for separating an internal space of a front case to be engaged with the rear case 1 from an accommodation space for the battery 3.

DISCLOSURE OF INVENTION

Problems to be Solved by the Invention

However, if the partition of the recess 2 of the rear case 1 of the mobile phone is omitted, the battery 3 faces the back face of a circuit board, which is disposed on a side facing toward the rear case 1, of an operation key member accompanying the front case. Thus, the battery 3 cannot be held in a stable manner.

If there is a gap between the back face of the circuit board and the battery, the circuit board is distorted when a person using the phone presses the operation key member. When this is repeated, soldered connections on the circuit board may become loose or circuit patterns on the circuit board may be damaged.

In view of the foregoing circumstances, it is an object of the present invention to provide a mobile terminal apparatus for preventing damage to a circuit board due to pressing of an operation key member and for reducing the thickness of a casing.

Means for Solving the Problems

According to the present invention, a mobile terminal apparatus includes a casing, an operation key member disposed on an external face of the casing, a circuit board facing the operation key member inside the casing and a battery facing the circuit board on a side opposite the operation key member inside the casing. The battery includes a board supporting part for supporting the circuit board. The board supporting part has a tip portion in abutting contact with the circuit board at a position facing the circuit board.

Figure 1:
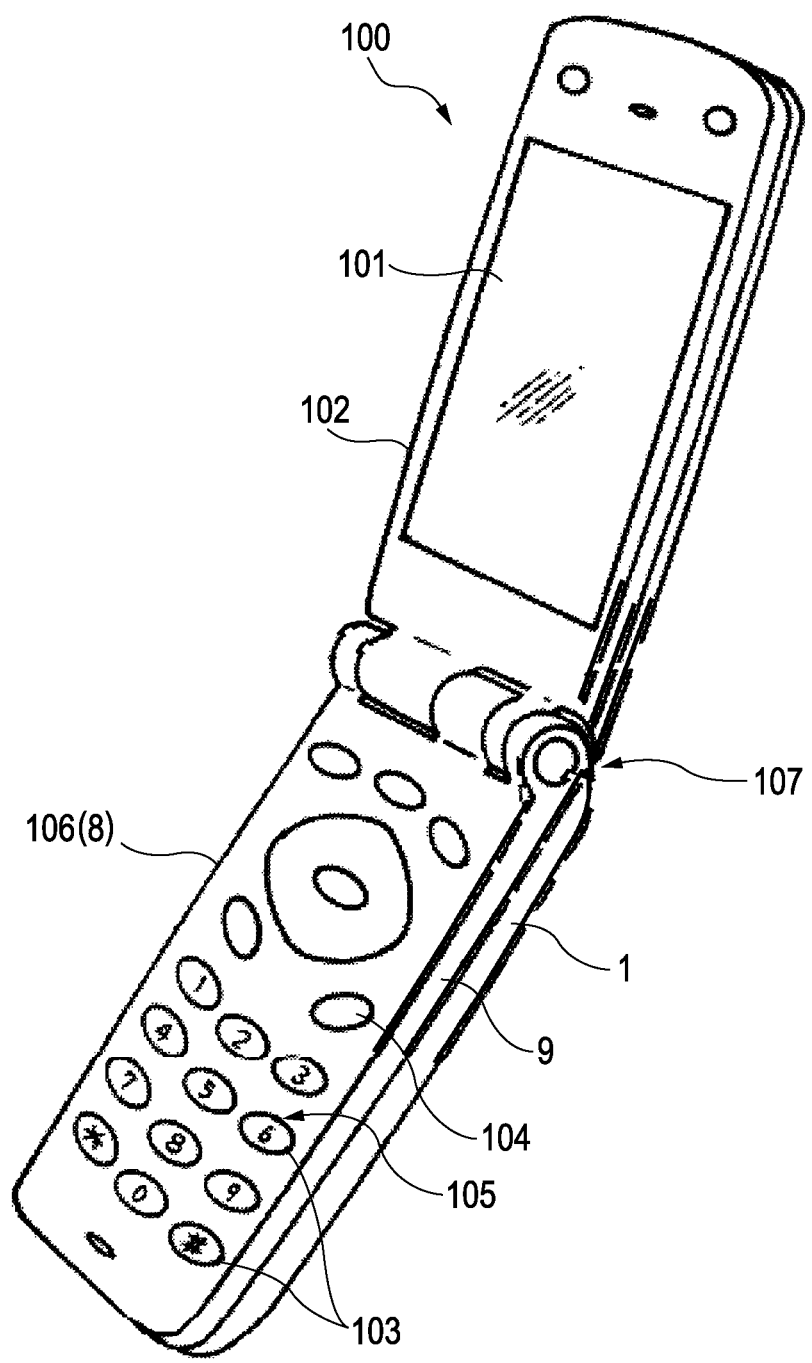
FIG. 1 illustrates an appearance of a mobile terminal apparatus according to an embodiment of the present invention.

REFERENCE NUMERALS 5 electrical connection part
8 casing
10 operation key member
11 circuit board
12 battery
13 electronic components
14 resin molded part
15 rib part
16 battery supporting part
17 battery supporting part

BEST MODES FOR CARRYING OUT THE INVENTION

Embodiments of the present invention will now herein be described on the basis of the drawings.

Figure 2:
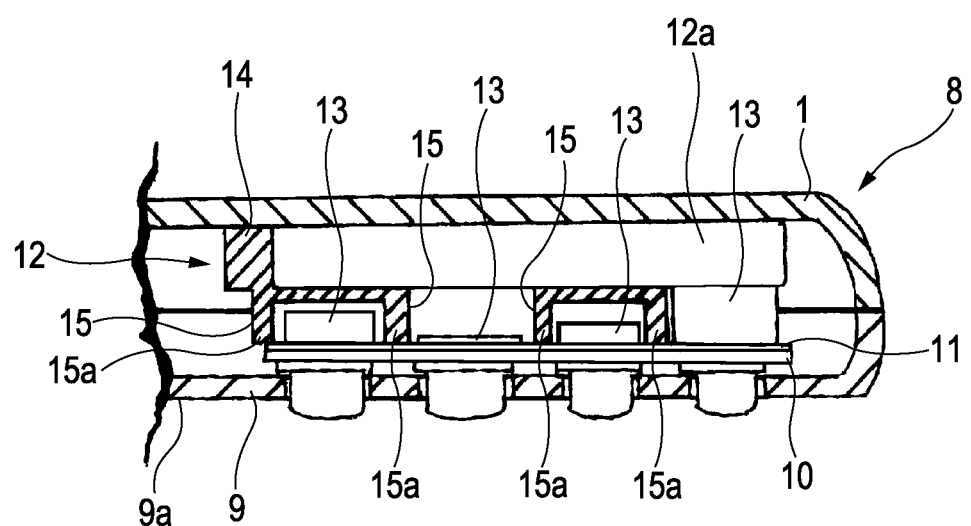
FIG. 2 is a partial cross-sectional view of a casing and a supporting part shown in FIG. 1 in the embodiment of the present invention.
Figure 3:
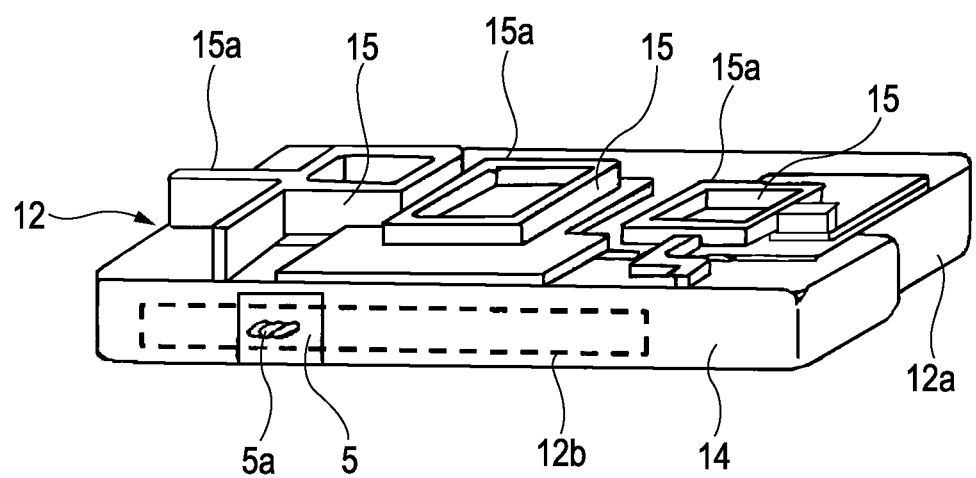
FIG. 3 is a perspective view of a battery shown in FIG. 2.

FIGS. 1 to 3 illustrate an embodiment of a mobile terminal apparatus of the present invention. FIG. 1 illustrates an appearance of a mobile phone 100 serving as a mobile terminal apparatus of the present invention. In the mobile phone 100, a display-unit-side casing 102 including a display unit 101 and an operation-unit-side casing 106 including operation keys 105 including a numeric key 103 and a selection key 104 are connected by a hinge 107 so as to be rotatable. The mobile terminal apparatus of the present invention is not limited to the configuration in which two casings are connected to each other.

A casing 8 constituting the operation-unit-side casing 106 includes a front case 9 and a rear case 1.

As shown in FIG. 2, the casing 8 contains an operation key member 10, a circuit board 11 and a battery 12. The operation key member 10 includes the operation keys 105 disposed on an external face 9a of the front case 9 (bottom side in FIG. 2) and is disposed on the side facing toward the front case 9 inside the casing 8. The circuit board 11 is facing the operation key member 10. The battery 12 is disposed on the side facing toward the rear case 1 inside the casing 8, which is opposite the operation key member 10, and faces the circuit board 11.

Electronic components 13 having various shapes are mounted on a surface, facing toward the battery 12, of the circuit board 11.

The battery 12 includes a battery cell 12a formed as a rectangular plate, a battery substrate 12b electrically connected to + and − terminals provided on a side face of the battery cell 12a, and an electrical connection part 5 electrically connected to the battery substrate 12b. These elements are integrally molded as a resin molded part 14 formed by low-pressure molding using polyamide or the like as a material so that a connection end 5a of the electrical connection part 5 is exposed.

The battery substrate 12b and the electrical connection part 5 are facing each other on one side face of the battery cell 12a (proximal side shown in FIG. 3). The connection terminal 5a of the electrical connection part 5 is disposed on a side face of the battery 12. This configuration reduces the thickness of the battery 12, thereby reducing the thickness of the casing 8.

As shown in FIGS. 2 and 3, rib parts 15 are provided on a face (first external face) of the battery 12 facing the circuit board 11. Tip portions 15a of the rib parts 15 in abutting contact with the circuit board 11 serve as board supporting parts for supporting the circuit board 11.

The rib parts 15 are integrally molded at the same time using the same resin material as that used to form the resin molded part 14. While the strength of the rib parts 15 and the resin molded part 14 are improved, the battery 12 can be made compact.

The rib parts 15 correspond to, of the electronic components 13, electronic components with the greatest thickness. The tip portions 15a of the rib parts 15 directly touch the battery 12. That is, the rib parts 15 have substantially the same or greater height than the electronic components 13 mounted on the surface of the circuit board 11 facing toward the battery 12. The planar shapes of the rib parts 15 are designed to avoid interference with the electronic components 13.

Accordingly, the circuit board 11 can be brought as close to the battery 12 as possible. Since the electronic components 13 engage with the rib parts 15, the positioning of the circuit board 11 and the battery 12 can be performed.

Furthermore, some of the rib parts 15 are formed as boxes with openings facing toward the circuit board 11 so as to enclose the electronic components 13. The electronic components 13 covered with the rib parts 15 and the resin molded part 14 of the battery 12 acquires a secondary shielding effect.

That is, as has been described above, the rib parts 15 abutting against and supporting the circuit board 11 are disposed on a counter face of the battery 12 (which is the first external face or the top side shown in FIG. 3). The back face of the battery 12 where there are no rib parts 15, that is, an external face opposite the external face where the rib parts 15 are disposed, which is the back face facing the internal face of the rear case 1 (which is a second external face or the bottom side shown in FIG. 3), is supported by the rear case 1. Even when stress is applied to the circuit board 11 by pressing the operation key member 10, distortion of the circuit board 11 supported by the rib parts 15 is suppressed, and damages and deformation of the circuit board 11 can be avoided. Furthermore, there is an advantage that an operational feeling is not deteriorated.

Figure 4:
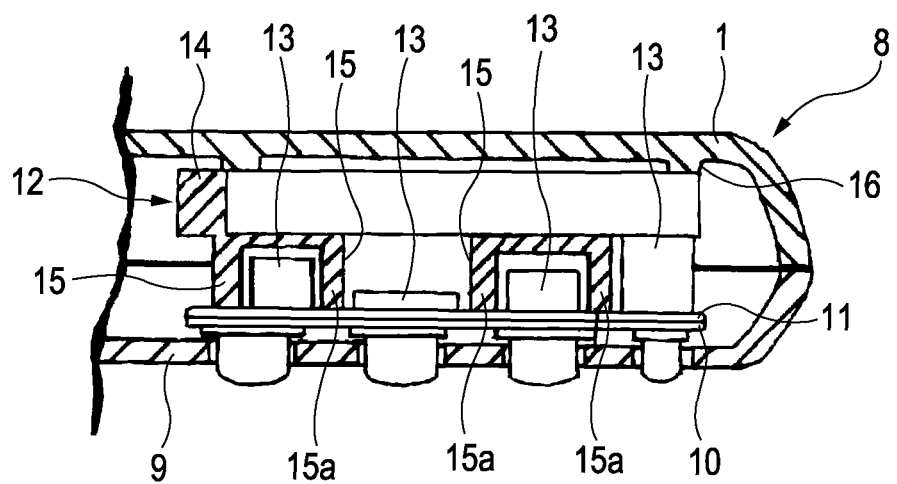
FIG. 4 is a partial cross-sectional view of a casing and a supporting part in another embodiment of the present invention.

FIG. 4 illustrates another embodiment of the mobile terminal apparatus of the present invention. In the view, portions given the same reference numerals as those in FIGS. 1 and 3 represent the same parts.

In this embodiment, the rear case 1 contains a battery supporting part 16 disposed on the internal face thereof. The battery supporting part 16 is formed as a frame in abutting contact with a peripheral portion which is the periphery of the back face of the battery 12 where no rib parts 15 are disposed.

The battery supporting part 16 is integrally molded at the same time using the same resin material as that used to form the rear case 1. While the strength of the battery supporting part 16 and the rear case 1 are improved, the rear case 1 can be made compact.

That is, even when the battery 12 swells out in the thickness direction of the casing due to a temperature increase, the deformation of the battery 12 is tolerated by a space enclosed by the battery supporting part 16. As a result, no needless force is applied to the electronic components 13 and the circuit board 11. The battery 12 is supported by the rear case 1 via the battery supporting part 16. As a result, the circuit board 11 can be effectively supported by the battery 12 via the rib parts 15.

Figure 5:
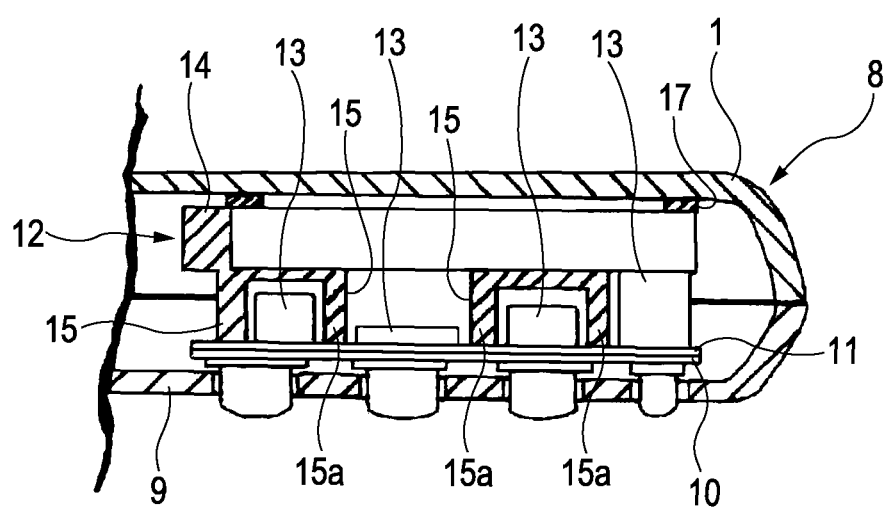
FIG. 5 is a partial cross-sectional view of a casing and a supporting part in another embodiment of the present invention.
Figure 6:
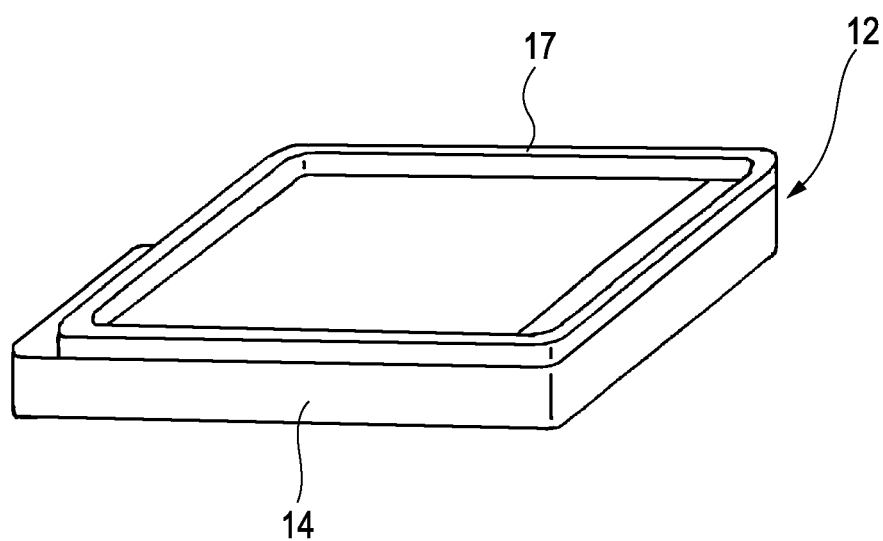
FIG. 6 is a perspective view of a battery shown in FIG. 5.
Figure 7:
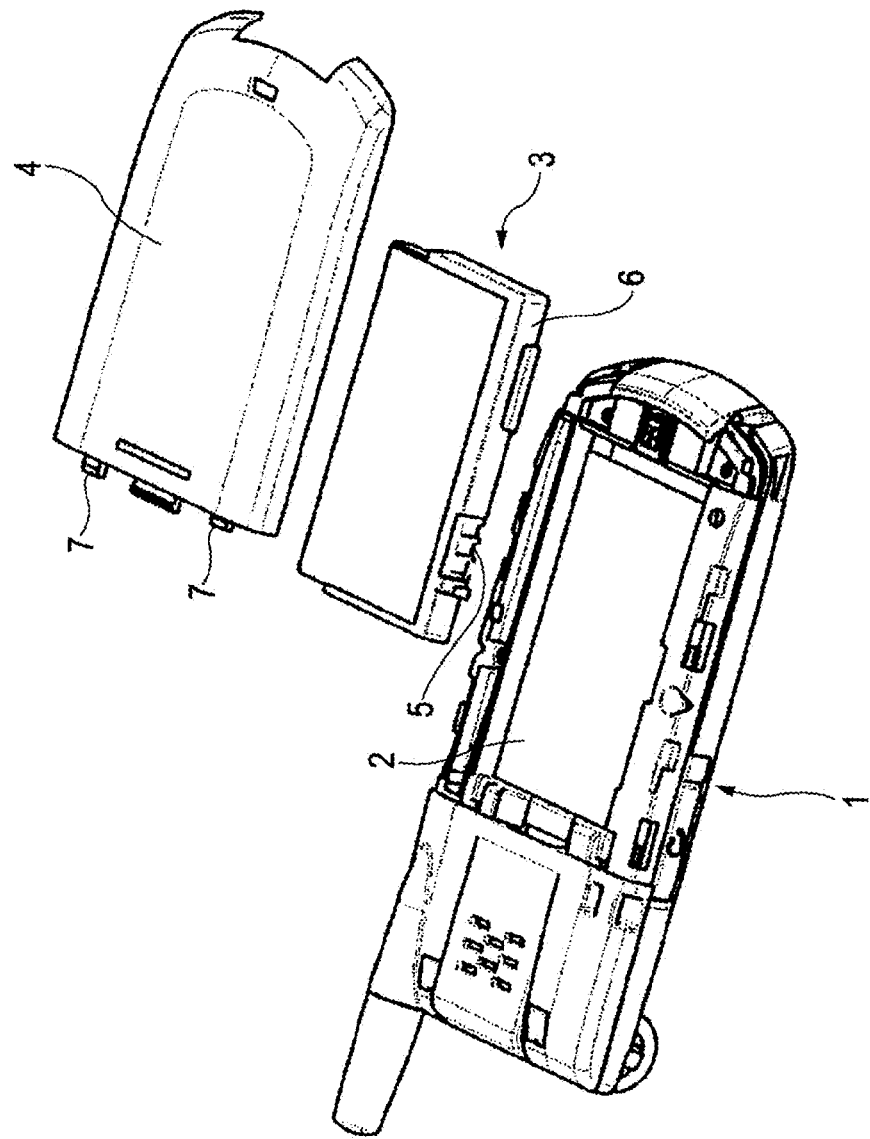
FIG. 7 is a perspective view showing a known mobile terminal apparatus.

FIGS. 5 and 6 illustrate another embodiment of the mobile terminal apparatus of the present invention. In the view, portions given the same reference numerals as those in FIGS. 1 and 4 represent the same parts.

In this embodiment, the battery 12 has a battery supporting part 17 on the back face of the battery 12 where no rib parts 15 are disposed (the top side shown in FIG. 5). The battery supporting part 17 in abutting contact with the internal face of the rear case 1 extends so as to have a frame shape along a peripheral portion which is the periphery of the back face of the battery 12 where no rib parts 15 are disposed.

The battery supporting part 17 is integrally molded at the same time using the same resin material as that used to form the resin molded part 14. While the strength of the battery supporting part 17 and the resin molded part 14 are improved, the battery 12 can be made compact.

The mobile terminal apparatus of the present invention is not limited to the foregoing embodiments, and changes can be made without departing from the scope of the present invention.

For example, the battery supporting parts 16 and 17 are integrally disposed on one of the battery 12 and the rear case 1. Alternatively, the battery supporting parts 16 and 17 may be disposed on both the battery 12 and the rear case 1. Alternatively, the battery supporting parts 16 and 17 may include members different from the battery 12 and the rear case 1, and the battery supporting parts 16 and 17 may be disposed so as to be sandwiched between the battery 12 and the rear case 1 and to support the battery 12. Alternatively, the battery supporting parts 16 and 17 may be elastically deformable to support the battery 12 in a manner involving elastic deformation.

Although the battery 12 is configured as the resin molded part by integrally molding the battery cell, the battery substrate, and the electrical connection, the battery 12 may be configured without involving molding. Although the rib parts 15 provided on the face of the battery 12 facing the circuit board 11 are integrally molded with the resin molded part 14, the rib parts 15 may include members different from the resin molded part 14 and may be provided on the face facing the circuit board 11.

The present application is based on Japanese Patent Application (Japanese Patent Application No. 2005-284435) filed on Sep. 29, 2005, the contents of which are incorporated herein by reference.

INDUSTRIAL APPLICABILITY

A mobile terminal apparatus of the present invention is applicable to various mobile terminals.

The invention claimed is:

1. A mobile terminal apparatus comprising:
a casing; an operation key member on an external face of the casing;
a circuit board having a first surface facing the operation key member inside the casing and a second surface opposite the first surface and at least one component mounted on the second surface; and a battery contained within the casing and having a third surface facing the second surface of the circuit board on a side opposite the operation key member inside the casing, wherein the battery comprises at least one rib extending outwardly from the third surface toward the second surface, the at least one rib making direct contact with the second surface while not contacting the at least one component, wherein the battery further includes a battery cell, a battery substrate electrically connected to terminals of the battery cell, and an electrical connection part electrically connected to the battery substrate, and the battery cell, the battery substrate, and the electrical connection part are contained within a single integrally molded part such that a connection end of the electrical connection part is exposed, and wherein the at least one rib is integrally formed and part of the integrally molded part, wherein the connection end of the electrical connection part is on a side face of the battery, wherein the side face is substantially perpendicular to the third surface.

2. The mobile terminal apparatus according to claim 1, wherein a height of the at least one rib is substantially equal to or greater than that of the at least one component mounted on the second surface of the circuit hoard.

3. The mobile terminal apparatus according to claim 1, further comprising a battery supporting part sandwiched between a fourth surface of the battery and an internal face of the casing, the fourth surface being opposite of the third surface of the battery and facing the internal face of the casing.

4. The mobile terminal apparatus according to claim 3, wherein the battery supporting part extends outwardly from a periphery of the fourth surface of the battery.

5. The mobile terminal apparatus according to claim 3, wherein the battery supporting part is elastically deformable.

6. The mobile terminal apparatus according to claim 1, wherein the at least one rib extends outwardly from a periphery portion of the third surface of the battery and surrounds the at least one component.

7. A mobile terminal apparatus comprising:
a casing;
an operation key member on an external face of the casing;
a circuit board having a first surface facing the operation key member inside the casing and a second surface opposite the first surface and at least one component mounted on the second surface; and
a battery contained within the casing and having a third surface facing the second surface of the circuit board on a side opposite the operation key member inside the casing,
wherein the battery comprises at least one rib extending outwardly from the third surface toward the second surface, the at least one rib making direct contact with the second surface while not contacting the at least one component, wherein the at least one rib comprises a box with an opening facing toward the circuit board and the box surrounds the at least one component, wherein the battery further includes an electrical connection part electrically connected to a battery substrate and a connection end of the electrical connection part is on a side face of the battery, wherein the side face is substantially perpendicular to the third surface.

8. A mobile terminal apparatus comprising:
a casing;
an operation key member on an external face of the casing;
a circuit board having a first surface facing the operation key member inside the casing and a second surface opposite the first surface and at least one component mounted on the second surface; and
a battery contained within the casing and having a third surface facing the second surface of the circuit board on a side opposite the operation key member inside the casing,
wherein the battery comprises at least one rib extending outwardly from the third surface toward the second surface, the at least one rib making direct contact with the second surface while not contacting the at least one component, wherein the at least one rib comprises a plurality of boxes with openings facing the second surface of the circuit board, each of the boxes surrounding at least one of a plurality of components mounted on the second surface, wherein the battery further includes an electrical connection part electrically connected to a battery substrate and a connection end of the electrical connection part is on a side face of the battery, wherein the side face is substantially perpendicular to the third surface.

9. The mobile terminal apparatus according to claim 8, wherein the plurality of boxes provide a secondary shielding effect to the plurality of components.

10. A mobile terminal device comprising:
a casing;
a circuit board having a first surface, a second surface opposite the first surface, and at least one electronic component mounted on the second surface; and
a battery contained within the casing and having a third surface facing the second surface of the circuit board, wherein the battery comprises at least one rib extending outwardly from the third surface toward the second surface, the at least one rib making direct contact with the second surface while not contacting the at least one electronic component, wherein the at least one rib comprises a box with an opening facing toward the second surface of the circuit board and the box surrounds the at least one electronic component, wherein the battery further includes an electrical connection part electrically connected to a battery substrate and a connection end of the electrical connection part is on a side face of the battery, wherein the side face is substantially perpendicular to the third surface.

11. The mobile terminal device of claim 10, wherein the at least one rib is integrally molded with the third surface of the battery.

12. The mobile terminal device of claim 10, wherein a height of the at least one rib is substantially equal to or greater than that of the at least one electronic component mounted on the second surface of the circuit hoard.

13. The mobile terminal device of claim 10, wherein the box provides a secondary shielding effect to the at least one electronic component.

14. The mobile terminal device of claim 10, wherein the at least one rib extends outwardly from a periphery portion of the third surface of the battery and surrounds the at least one component.

15. The mobile terminal device of claim 10, wherein the at least one rib provides a desired spacing between the third surface and the second surface and prevents substantial movement of the circuit board within the casing.

16. A mobile terminal device comprising:
a casing;
a circuit board having a first surface, a second surface opposite the first surface, and at least one electronic component mounted on the second surface; and
a battery contained within the casing and having a third surface facing the second surface of the circuit board, wherein the battery comprises at least one rib extending outwardly from the third surface toward the second surface, the at least one rib making direct contact with the second surface while not contacting the at least one electronic component, wherein a height of the at least one rib is substantially equal to or greater than that of the at least one electronic component mounted on the second surface of the circuit board and the at least one rib comprises a plurality of boxes with openings facing the second surface of the circuit board, each of the boxes surrounding at least one of a plurality of components mounted on the second surface, wherein the battery further includes an electrical connection part electrically connected to a battery substrate and a connection end of the electrical connection part is on a side face of the battery, wherein the side face is substantially perpendicular to the third surface.

* * * * *